(12) United States Patent
Kumaran et al.

(10) Patent No.: US 7,283,745 B2
(45) Date of Patent: Oct. 16, 2007

(54) METHODS AND APPARATUS FOR CONSTRUCTING SWITCH ARRAYS FOR ROUTING OF OPTICAL SIGNALS SO AS TO MINIMIZE POWER DISSIPATION

(75) Inventors: Krishnan Kumaran, Scotch Plains, NJ (US); Timothy O. Murphy, Fairport, NY (US); Nachi K. Nithi, Wayne, NJ (US); Carl Jeremy Nuzman, Summit, NJ (US); Gaylord W. Richards, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 645 days.

(21) Appl. No.: 10/403,579

(22) Filed: Mar. 31, 2003

(65) Prior Publication Data

US 2005/0084264 A1 Apr. 21, 2005

(51) Int. Cl.
*H04J 14/00* (2006.01)

(52) U.S. Cl. .................................................. 398/45

(58) Field of Classification Search ............ 398/45–57; 385/14

See application file for complete search history.

(56) References Cited

U.S. PATENT DOCUMENTS

| | | | | |
|---|---|---|---|---|
| 5,212,587 A | * | 5/1993 | Healey ....................... 359/301 |
| 5,896,474 A | * | 4/1999 | Van Deventer et al. ....... 385/24 |
| 5,937,117 A | * | 8/1999 | Ishida et al. .................. 385/24 |
| 6,243,178 B1 | * | 6/2001 | Suemura et al. .............. 398/56 |
| 6,389,191 B1 | * | 5/2002 | Borreman et al. ............ 385/22 |
| 6,674,935 B2 | * | 1/2004 | Kelly et al. .................... 385/24 |
| 2002/0131710 A1 | * | 9/2002 | Doerr ........................... 385/39 |
| 2003/0123778 A1 | * | 7/2003 | DePue et al. ................. 385/14 |
| 2004/0151497 A1 | * | 8/2004 | Lee et al. ...................... 398/45 |
| 2004/0223762 A1 | * | 11/2004 | Lee et al. ...................... 398/51 |
| 2004/0258406 A1 | * | 12/2004 | Kumaran et al. ............. 398/45 |

\* cited by examiner

*Primary Examiner*—Jason Chan
*Assistant Examiner*—Quan-Zhen Wang

(57) ABSTRACT

Techniques and systems for design of optical switch arrays so as to minimize power requirements are described. A design system includes a computer system hosting a design program. The design program receives parameters for the switch array, including a number N of outputs required, and either a maximum number L of stages allowed or maximum and average power requirements allowed. If power requirements are used as parameters, the design program uses N and the power requirements to compute the value of L. The design program then constructs a minimum power sequence of L switches or N switches, whichever is less. If N is less than L+1, N outputs are present and the array is complete. If N is greater than L+1, the design program then adds switches one at a time to the minimum power switch path of the array, until the array provides N outputs.

10 Claims, 5 Drawing Sheets

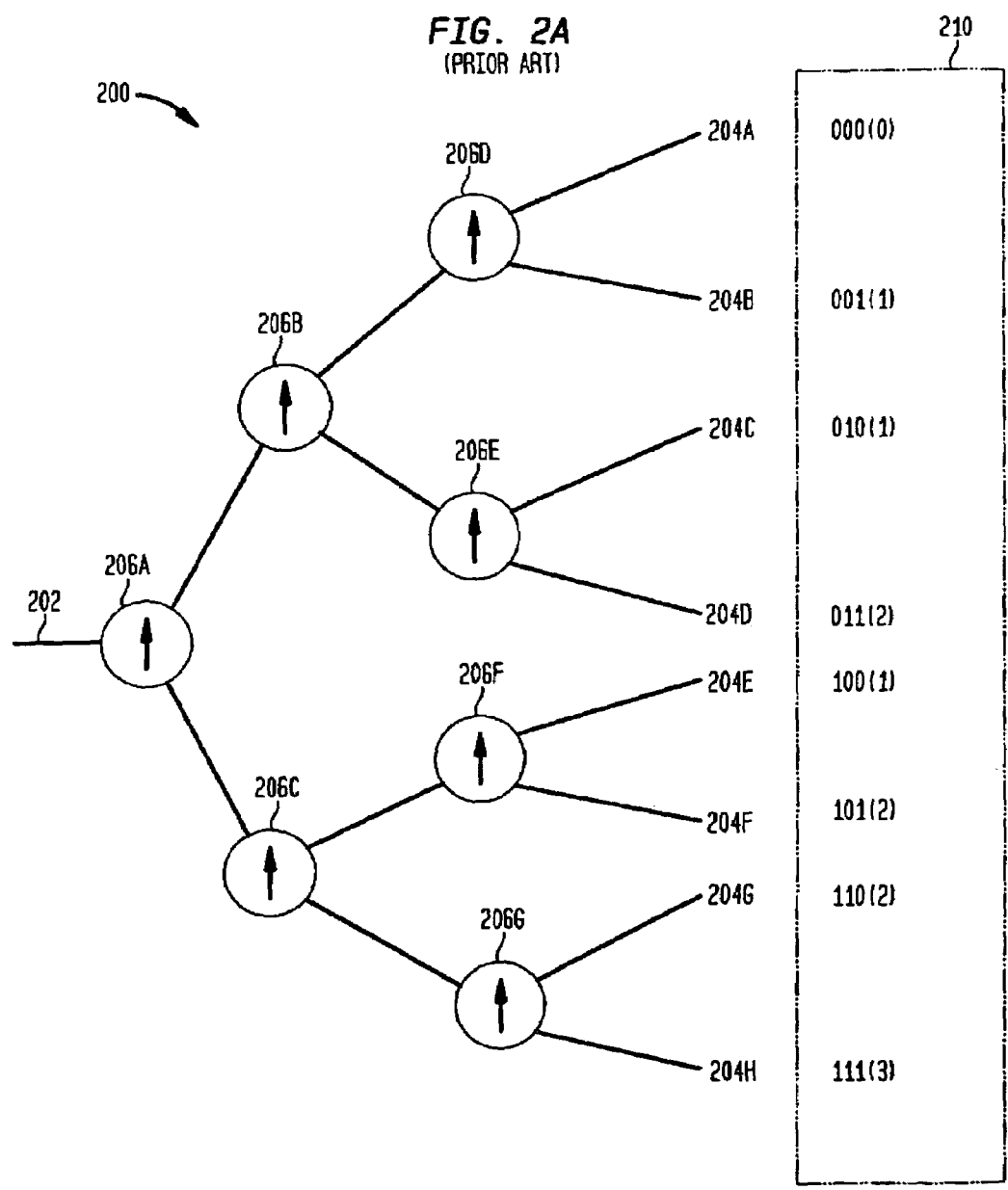

METHODS AND APPARATUS FOR CONSTRUCTING SWITCH ARRAYS FOR ROUTING OF OPTICAL SIGNALS SO AS TO MINIMIZE POWER DISSIPATION

FIELD OF THE INVENTION

The present invention relates generally to routing of optical signals. More particularly, the invention relates to construction of switch arrays adhering to depth constraints such that a switch array of a particular depth exhibits minimum power requirements attainable for a switch array of that depth.

BACKGROUND OF THE INVENTION

Optical communications are often carried out using a plurality of signals, each signal occupying one of a plurality of wavelengths, with the signals carried by a single optical fiber. Each signal is routed to a desired port through a series of multiplexers and arrays of switches. A fiber carrying a combined signal comprising a number of wavelengths W may be supplied to a routing assembly capable of routing each wavelength to one of a number of outputs N. In some systems, each wavelength will be routed to a single output, with each output carrying a single wavelength. In such a case the number of wavelengths W is equal to the number of outputs N.

For example, a fiber may carry a combined signal comprising eight wavelengths, each of which is to be routed to one of eight ports, with each port carrying only one wavelength. At any time, any wavelength may be routed to any port. In the case of a signal comprising eight wavelengths, the combined signal is demultiplexed to form W signals of different wavelengths, for example using a demultiplexer having one input and W outputs, with the number W in the present exemplary case being eight. Each of the signals is routed to one of W switch arrays, with each switch array having one input and N outputs. In the case of an assembly having eight wavelengths and eight outputs, the number of switch arrays is eight and the number of outputs of each switch array is eight. Depending on the port to which the signal is to be routed, each signal is subject to be routed to any of the switch outputs of its switch array. The outputs of the switch arrays are supplied to N multiplexers, each having N inputs and one output, in this case eight multiplexers, each having eight inputs and one output. The first output of each array is supplied to a multiplexer whose output is in turn supplied to the first port, the second output of each array is supplied to a multiplexer whose output is in turn supplied to the second port, and so on. By suitable setting of each switch array, any signal may be supplied to any port.

Alternatively, it is possible for more than one wavelength to be carried by a single output port. Such a design allows for a routing system to be constructed for which the values of W and N are different. For example, a system might be constructed to route each of twelve wavelengths onto one of eight outputs. The system would include a one by twelve demultiplexer and twelve switch arrays having eight outputs each, feeding an array of eight multiplexers each having twelve inputs and one output.

One of two different alternative techniques is commonly used for signal routing. The first may be referred to as wavelength permutation routing, where only wavelength from the combined input signal is routed to a particular output port at the same time. The other technique may be called wavelength independent routing, and allows more than one signal to be routed to a single port at the same time.

A useful way to implement a switch array to be used for routing of optical signals is to construct the array as an array of silica waveguide based thermo optic switches. Such switches can route a single input to one of two outputs. Routing a signal to one output of such a switch requires a lower power dissipation, while routing a signal to the other output requires a higher power dissipation. Therefore, such switches can be thought of as having a low power position and a high power position, or a low power output and a high power output.

Prior art techniques for design of switch arrays seek to minimize the number of levels of an array, that is, the maximum number of switches through which the signal must pass, in order to minimize possible signal loss and the likelihood of errors. However, minimizing the number of levels of an array typically does not minimize the maximum and average power dissipation of the array, and wavelength independent routing in particular imposes power constraints on the arrays, requiring the worst case and average power dissipated by the array to fall within limits imposed by the desired design of the system in which the array is to be used.

The worst case power of an array is the power dissipated in the path requiring the highest power consumption, and the average power is the average power dissipation of the paths. The power dissipation of a path may suitably be defined as the number of switches in the high power position for the path under consideration. Increasing the power dissipation of an array leads to increased heat generation with the accompanying need to dissipate the heat. Minimizing the power dissipation of switch arrays employed by a routing system is particularly advantageous, because a device exhibiting lower power dissipation can be made more compact and less expensive.

If proper design techniques are used for a switch array, increasing the number of levels above the minimum necessary to support the desired number of outputs allows for significant decreases in the power dissipation of the array. In some cases, it may be necessary for the power dissipation of an array to fall within prescribed power constraints, with these constraints being more stringent if wavelength independent signal routing is to be used. There exists, therefore, a need for systems and techniques for developing switch arrays in which the switches are arranged so that the maximum and average power dissipation of the array, that is, the maximum and average number of switches in the high power position, is at the minimum that can be achieved given any limits on the number of stages of the array.

SUMMARY OF THE INVENTION

A switch array design system according to an aspect of the present invention suitably includes a design program that may reside in a computer memory and be executed by a processor. In order to construct a switch array, the design program receives as inputs a value for N, which is the number of outputs desired, and either the power dissipation to be allowed or the maximum number L of stages to be allowed. If the power dissipation is received as a parameter, the design program computes the number of stages using the relationship between power, number of outputs and number of stages.

A switch array is constructed by first constructing a linear, minimum power array of length N, if N is less than L, or length L, if N is greater than or equal to L. If N is less than or equal to L+1, the process is finished, because the array will provide L+1 outputs, having available a low power output of each switch, as well as a high power output of one of the switches.

In the more typical case, N is greater than L+1. In such a case, in order to achieve the desired number N of outputs, a new switch is added to the array such that the new branch represents the path requiring the minimum possible power, given the constraint on the number of stages of the array, that is, on the value of L. New switches are added until the required number of outputs is provided. As an alternative procedure, the design program may establish an array comprising the maximum possible number of switches given the constraint on the value of L. A switch is then repeatedly removed from the maximum power path of the array until only N outputs are provided. In either procedure, once the array has been constructed, a representation of the array or instructions for building the array are provided as an output.

A more complete understanding of the present invention, as well as further features and advantages, will be apparent from the following Detailed Description and the accompanying drawings.

BRIEF DESCRIPTION OF THE DRAWINGS

FIGS. 2A and 2B illustrate exemplary switch arrays that may be designed by a system according to the present invention;

DETAILED DESCRIPTION

The present invention will be described more fully hereinafter with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
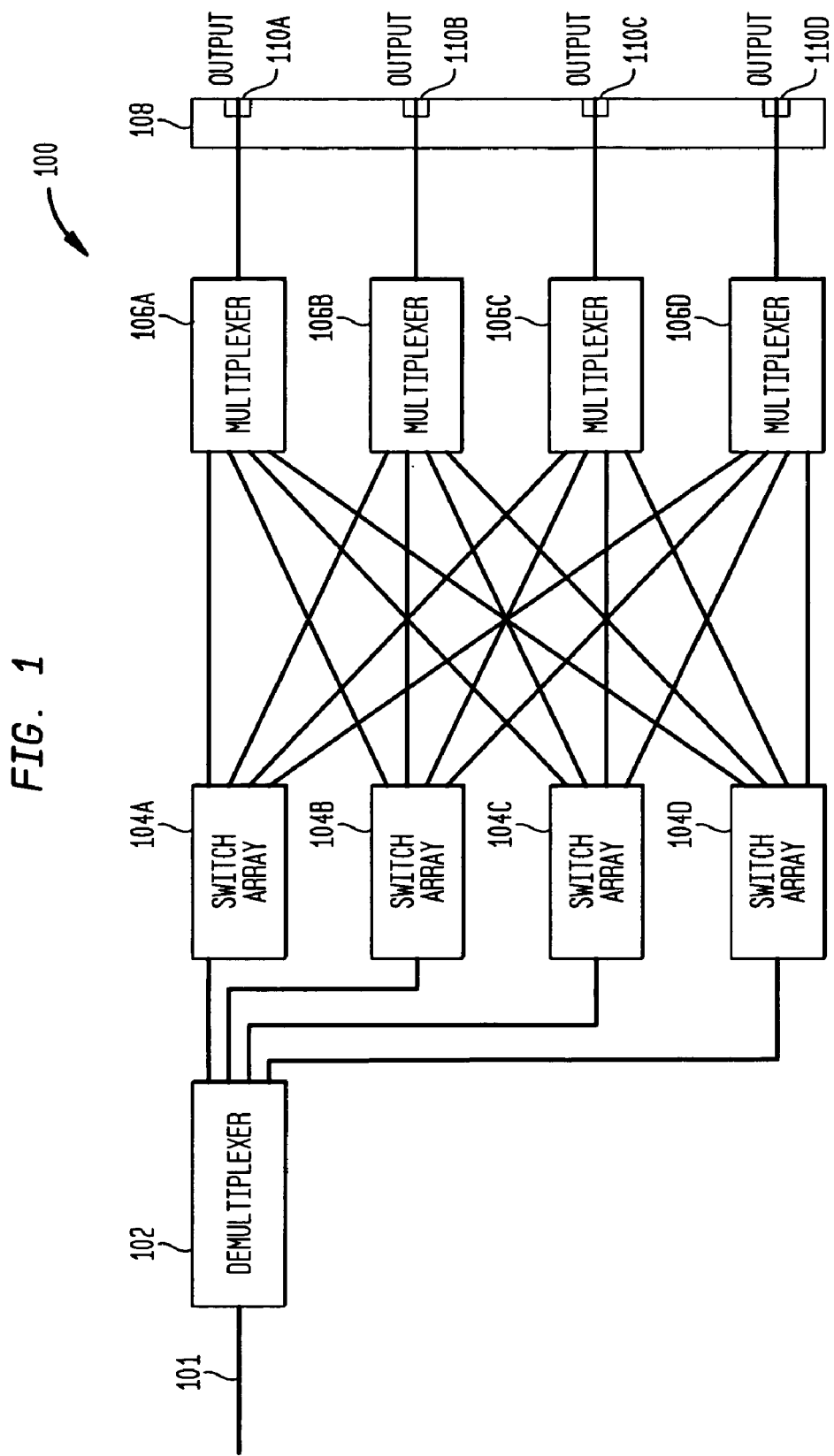
FIG. 1 illustrates a signal routing system that may suitably employ switch arrays designed according to the teachings of the present invention.

FIG. 1 illustrates a signal routing system 100 employing switch arrays that may suitably be designed according to the teachings of the present invention. The system 100 includes an input 101 that may suitably be a combined signal comprising a plurality of single wavelength components. The input 101 supplies a demultiplexer 102, which demultiplexes the combined signal and supplies a single wavelength signal to each of four switch arrays 104A-104D. The switch arrays may suitably comprise arrays of silica waveguide thermo optic switches. Each of the switch arrays has four outputs, with each output being supplied to one of four multiplexers 106A-106D. The first output of each switch array is supplied to the multiplexer 106A, the second output of each switch array is supplied to the multiplexer 106B, the third output of each switch array is supplied to the multiplexer 106C and the fourth output of each switch array is supplied to the multiplexer 106D. Each of the multiplexers 106A-106D supplies an output to the output array 108, which provides the outputs 110A-110D of the system 100.

Each wavelength present in the combined signal can be routed to one of the outputs 110A-110D, simply by routing it to an appropriate output of the switch array to which it is supplied as an input.

For purposes of illustration, the switch arrays 104A-104D have four outputs each, but a system such as the system 100 may suitably route a combined signal comprising many wavelengths and may use large and elaborate switch arrays for routing of signals. It is also possible to operate the routing system 100 or other similar systems in wavelength permutation mode, such that each output receives only a single wavelength, or in wavelength independent mode, such that more than one wavelength may be routed to a single output. As an example of wavelength independent mode operation, the switch array 104A may route its output to the multiplexer 106A, and the switch array 104B may also route its output to the multiplexer 106A. In such a case, the multiplexer 106A would combine the signals received from the switch arrays 104A and 104B and the output 110A would be this combined signal.

Wavelength independent mode operation in particular imposes power constraints on the switch arrays used in a system such as the system 100. The use of silica waveguide thermo optic switches provides that the switches will have low power and high power positions. Each switch having a higher power output requiring a higher power dissipation when the signal is routed to that output and a lower power output requiring a lower power dissipation when the signal is routed to that output. Preferably, the switch arrays in such a system will be designed so as to minimize power consumption, that is, to minimize the number of switches operated in the low power positions, while keeping the number of stages of the array small enough so that the passage of a signal through a sequence of switches does not cause undue losses.

Figure 2B:
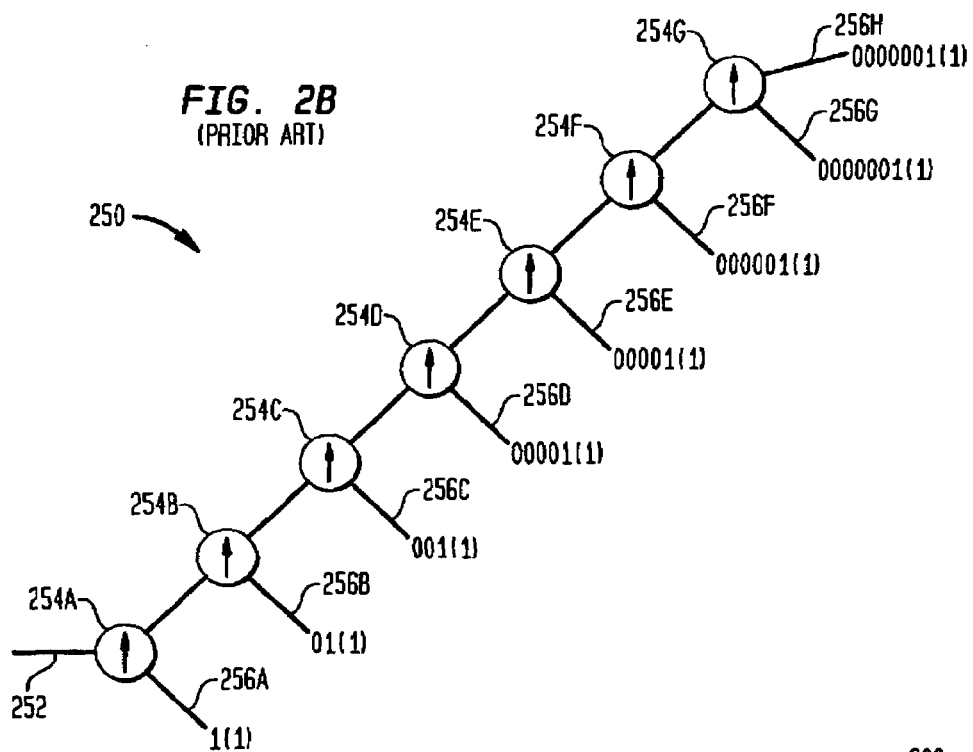

FIGS. 2A and 2B illustrate switch arrays that may be designed using a system according to an aspect of the present invention and used in a system such as the system 100. FIG. 2A illustrates a switch array 200 having a single input 202 and eight outputs 204A-204H. The switch array 200 comprises a plurality of switches 206A-206G, in order to route a signal received at the input 202 to one of the outputs 204A-204H. The switches 206A-206G are represented by circles having a single input line and two output lines. The upper output line of each switch is the low power, or "up," output line requiring a lower power dissipation when the signal is routed to that output and the lower output line of each switch is the high power, or "down," output line requiring a higher power dissipation when the signal is routed to that output. The arrow on each of the switches 206A-206G indicates the position of the low power output of the switch, that is, the direction in which the signal is routed when no power is applied to the switch. In the present representation, the low power output is the "up" output, so the arrows point upward. A switch set to route the input to the "up" output may be said to be in the "up" position or setting, while a switch set to route the input to the "down" output may be said to be in the "down" position or setting.

The switch array 200 has three stages, or levels. That is, a sequence including a maximum of three switches lies between each of the output ports 204A-204H and the input 202. A signal at the input 202 is routed to a selected one of the outputs 204A-204H by setting each of the switches in a sequence to the "up" or "down" position so that the signal is routed to the desired output. For example, in order to route the signal to the output 204A, the switches 206A, 206B and 206D would be set to the "up" position. In order to route the signal to the output 204H, the switches 206A, 206C and 206G would be set to the "down" position.

The array 200 of FIG. 2A includes the minimum number of stages required for routing a signal to one of eight ports. The maximum power consumption of the array, that is, the maximum number of "down" switches between the input 202 and the selected one of the outputs 204A-204H is three. The only path with three "down" switches is the path from the input 202 to the output 204H. The average power consumption of the array, that is, the average number of "down" switches in a path, is 1.5. A binary switch code is shown beside each output in block 210. The number of bits in the binary switch code is the number of switches in the path, and the number of "1's" in the binary switch code is the number of "down" switches in the path. In parentheses beside each switch code, the number of "down" switches is shown in parentheses. It is possible to design arrays exhibiting lower power consumption by increasing the number of stages allowed.

FIG. 2B illustrates a switch array 250, including an input 252, seven switches 254A-254G and eight outputs 256A-256H. The array 250 is a seven level array because a path between the input 252 and one of the outputs 256A-256H, namely the output 256H, includes as many as seven switches. The increased number of levels allows a reduction in power usage, because no more than one "down" switch needs to lie between the input 202 and one of the outputs 256A-256H. The maximum power consumption required by the array 250 is 1, and the average power consumption is 0.875. Increasing the number of required levels allows significant decreases in power consumption.

Many switch arrays are large and elaborate. Moreover, power requirements of an array can be reduced if the array is designed with more levels than required to provide the needed number of outputs. It will be noted, for example, that a seven level array could support 128 outputs, but the array 250 supports only 8 outputs. Allowing the switch array 250 to include more levels than required to support a particular number of outputs allows choices to be made in the paths from the input to the outputs. In the case of the array 250, these paths have been chosen to minimize power consumption. A design system according to an aspect of the present invention allows for automated design of switch arrays. Given the number of outputs desired and the number of levels allowed, the design system creates a design for an array that will minimize the power consumption of the array.

Figure 3:
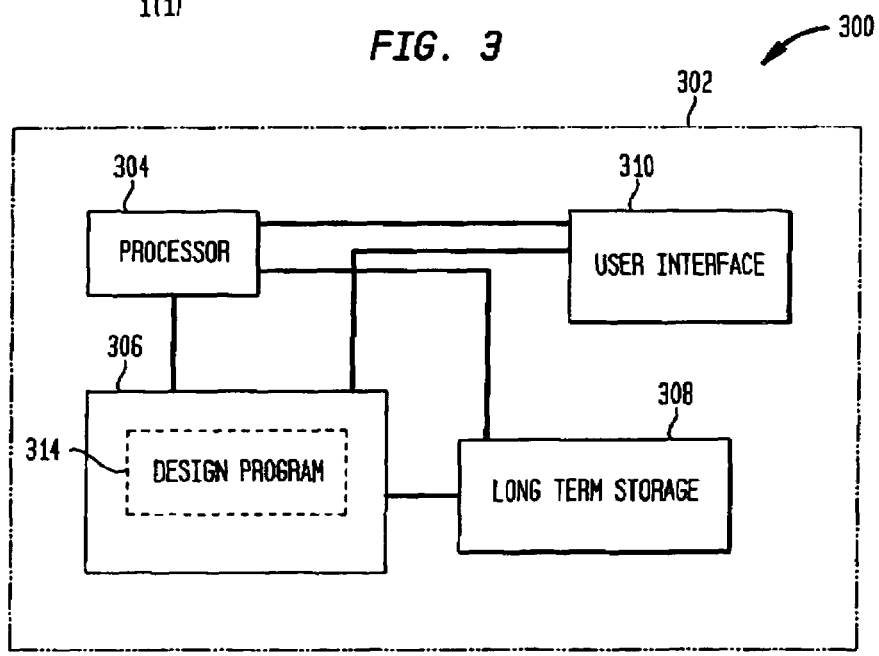
FIG. 3 illustrates a system for designing a switch array according to an aspect of the present invention.

FIG. 3 illustrates a switch array design system 300 according to an aspect of the present invention. The system 300 comprises a computer 302 including a processor 304, memory 306 and long term storage 308, as well as an external interface 310 to accept external inputs and data and to produce output and solutions. The system 300 implements a switch design program 314, which preferably resides in the memory 306 and is executed by the processor 304. The design program 314 is used to create a design for an array of binary switches for use in routing optical signals, taking into account the need to keep the number of stages of the array within a specified limit and to minimize the average power dissipated by the array. The design of the array may suitably be provided in the form of a map, matrix or other indicia that can be easily interpreted in order to create the layout of the array.

An operator using the system 300 may first enter a number N of outputs desired for a switch array, and either a maximum number L of levels to be allowed for the array or alternatively the maximum or average power to be dissipated by paths within the array. If the maximum or average power is used as the constraint, the design program 314 computes the maximum number L as the number of levels required to achieve the desired number of ports while keeping the average power within the specified limit.

The relationship between the power dissipated by an array, the number of outputs of the array and the number of stages of the array is given as follows. Suppose N=the number of outputs, L=the maximum number of stages, P=the maximum power and $\overline{P}$=the maximum average power. M(L,P) is the maximum number of outputs possible for an array given that the array has no more than L stages and a worst case power constraint of P for each output. That is, the maximum number of "down" switches in a path from an input to an output can be no greater than P. In that case, $$M(L, P) = \sum_{k=0}^{P} \binom{L}{k}.$$

$$\binom{L}{k},$$

it will be noted, is the number of possible combinations of L objects taken k at a time, and can be computed as follows:

$$\binom{L}{k} = \frac{L(L-1)\cdots(L-k+1)}{k(k-1)\cdots(1)}$$

The power dissipation of a switch array, expressed as a number of "down" switches in the path from the input to the output of the array, can be computed given the number of outputs N and the number of stages L of an array, and the minimum required number of stages L of an array can be computed given the number of outputs N and the maximum and average power dissipation P and $\overline{P}$ of the array. Because the number of "down" switches is less than or equal to the number of stages, for every output, the maximum number of outputs for a given number of stages is $M(L,L)=2^L$.

Computing the constraints on a switch array involves computing the worst case power P and average power $\overline{P}$ of the array, given a number of outputs N and a maximum number of stages L.

A binary switch array cannot be constructed such that the number N of outputs is greater than $2^L$. If N is not greater than $2^L$, the value of P is the smallest integer in the range {0, ..., L} such that the equation $M(L,P) \geq N$ is satisfied. In that case, the minimum average power is $$\overline{P} = \frac{1}{N}\left[\sum_{k=1}^{P} k\binom{L}{k} - P(M(L,P) - N)\right].$$

If the value of L is not predetermined, the design program 314 computes the value of L required given a desired number of outputs N and the power constraints $P \leq C_1$, $\overline{P} \leq C_2$.

The case N=1 is degenerate since no power is required and L=0. That is, no switch is needed. In most cases, however, the value of N is greater than 1. The problem is infeasible if $C_1<1$ or $C_2<(N-1)/N$. In that case, the design program notifies the operator that the entered requirements cannot be met.

If the given constraints can be met, the value of L is computed using an iterative process. First, the values of P and $\overline{P}$ are computed, with L being set to the smallest integer such that $2^L \geq N$. If the resulting values of P and $\overline{P}$ do not meet the constraints, the value of L is increased by one, and the values of P and $\overline{P}$ are computed again. This process is repeated until the constraints are met. Both P and $\overline{P}$ decrease each time L is decreased, eventually attaining P=1, $\overline{P}=(N-1)/N$, when $L=(N-1)$.

Once the number L has been computed, the design program 314 begins construction of a map to be used in creating a physical array of switches. First, the design program 314 creates a linear arrangement of either L or N two position switches. If the value of N is less than that of L, the arrangement will have N switches and if the value of N is greater than or equal to that of L, the arrangement will have L switches. Each switch will have an "up" output and a "down" output. Each succeeding switch in the arrangement is connected to the "up" output of the preceding switch. The first output port of the switch array is always the output reached by the "up" outputs of the final switch in the initial arrangement, because this output is the lowest power output of the array. For example, in the design of the array 200, the first arrangement of switches created by the design program 314 would be the sequence of switch 206A, switch 206B and switch 206D. Similarly, in the design of the array 256, the first arrangement of switches created by the design program 314 would be the sequence of switches 254A-254G.

If the value of N is less than or equal to the value of L+1, the array is finished, because the number of outputs required is provided by the linear array. In the more typical case, in which the value of N is greater than the value of L+1, the design program 314 then adds additional switches to the switch array until the switch array includes N outputs, with each new switch being added to the lowest power path available that will not cause L to be exceeded. Each switch is added to the lowest power switch output. If two or more switch outputs provide the lowest available power attachment for a switch, the additional switch will be added which provides the minimum depth. If two or more choices exist providing the lowest available power attachment and adding minimum depth, an arbitrary or random choice may then be made. In the case of the switch array 200, for example, the next switch to be added would be the switch 206C. Each available path is a "down" path, but the switch 206C is connected to the switch 206A and is therefore at a depth of 2. The switch 206E would be at a depth of 3.

The next switch to be added after the switch 206C would be either the switch 206E or the switch 206F, because both of these switches would be added to a path comprising one "down" switch and one "up" switch, and because both of these switches would be at a depth of 3. After adding both of these switches, the last switch to be added would be the switch 206G, because this switch would be added to the only remaining path. Because the lowest power available path was chosen in all other additions, the highest power path remains after all other choices have been exhausted.

The approach of adding branches described above may conveniently be referred to as a constructive approach. As an alternative, the design program 214 may take a pruning approach. In a pruning approach, a maximum array having L stages is initially created. After the initial creation, outputs requiring the greatest power consumption are eliminated one at a time, until the number of outputs of the array matches the number of outputs required. As in the constructive approach, if two or more branches exist requiring the same power consumption, the branch having the greatest depth is eliminated. If two or more branches exist requiring the same power consumption and having the same depth, an arbitrary or random choice may be made.

Representation of the switch array as it is being constructed and as it appears in its finished form may be accomplished in any desired fashion. For example, the design program 314 may construct a map representing switches and connections, similar to a human readable map, and may add switches and connections to and remove switches and connections from the map as it is being constructed. Alternatively, the design program 314 may employ machine readable symbols to represent the switch array as it is being constructed and may produce a machine readable or human readable representation as an output of the final version of the array.

One convenient way of representing the switch array is as a set of binary words, each being a representation of a path from the input to an output, in which the "up" output of a switch is represented as a "0" and the "down" output of a switch is represented as a "1". Because paths to different outputs may have different lengths, all such words are read from left to right, with the most significant bit of each word representing the switch position of the first switch in the path and the least significant bit of each word representing the switch position of the switch leading to the output. The switch array 200 would be represented by the words "000," "001," "010,", "011," "100," "101," "110" and "111." The switch array 250 would be represented by the words "0000000," "0000001," "000001," "00001," "0001," "001," "01" and "1". Such a representation is easily manipulated and interpreted by a machine and is particularly appropriate for use with large arrays that may include hundreds of switches in which the array is to be created by automated machinery.

Figure 4:
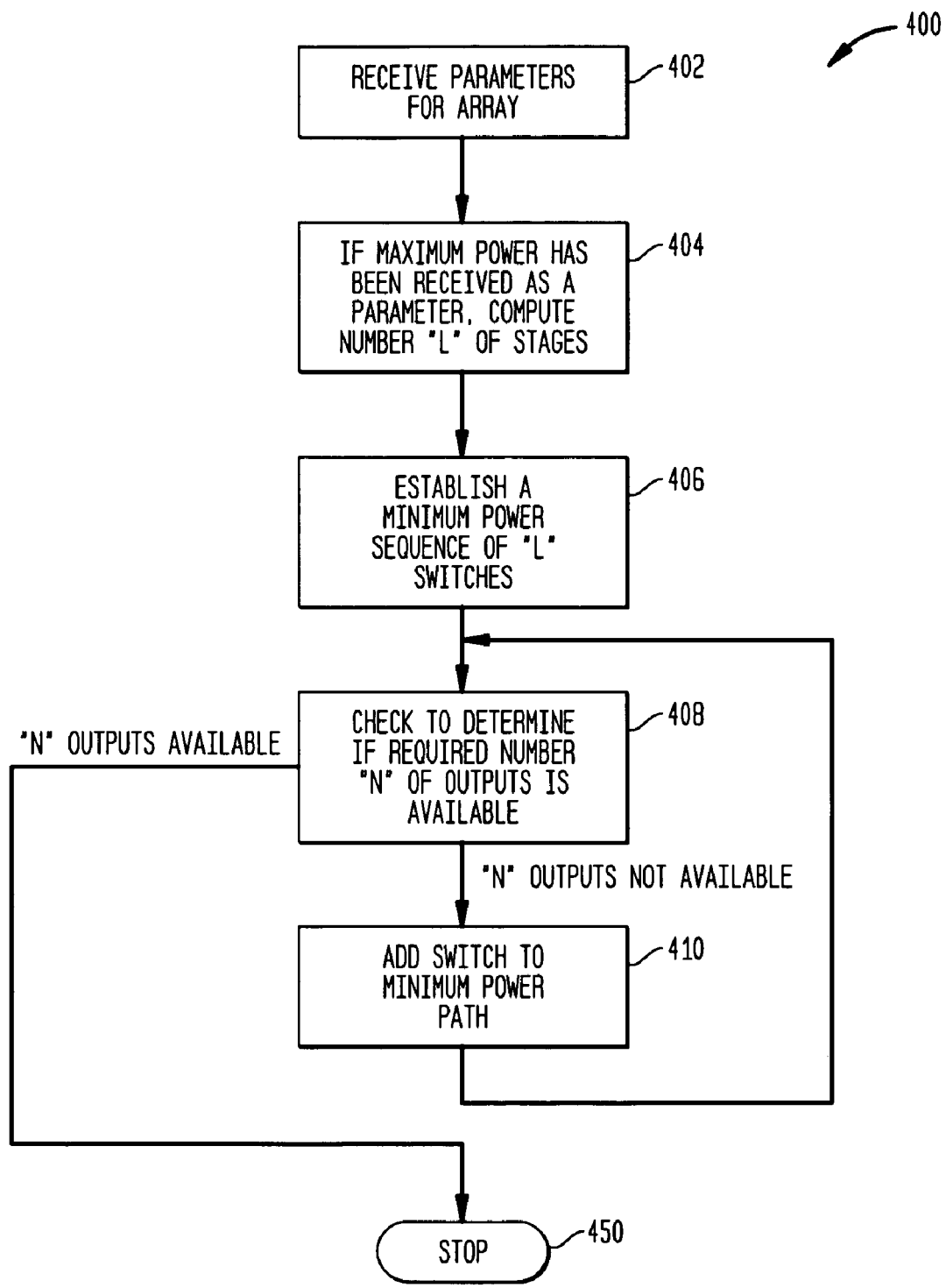
FIG. 4 illustrates a process of switch array design according to an aspect of the present invention.

FIG. 4 illustrates the steps of a process of switch array design 400 according to an aspect of the present invention. At step 402, parameters for the array are received. The parameters include a number N of outputs required and may include either the maximum number L of stages or the power consumption allowed. At step 404, if the allowable power consumption has been received as an input, this value is used to compute the value of L. At step 406, a single switch is deployed between the input and an output.

At step 408, the number of outputs provided by the switch array is examined to determine if the number of outputs N has been reached. If the number N has not been reached, the process proceeds to step 410. If the number N has been reached, the process ends at step 450. At step 410, an additional switch is added to the array. The switch is added to the lowest power path still available. If two or more paths are available having equal power consumption, the switch is added to the path having the lowest depth. If two or more paths are available having equal power consumption and equal depth, so that they are equally acceptable, an arbitrary choice is made among the equally acceptable paths. The process then returns to step 408.

It will be recognized that deploying a single switch, and then following the procedure described in steps 408 and 410, will result in an initial array of L switches, if N is greater than L, or N switches, if N is less than L, with each switch being connected to the low power output of the preceding switch in the sequence. If N is greater than L, additional switches will be added to this sequence until construction of the array is complete.

Figure 5:
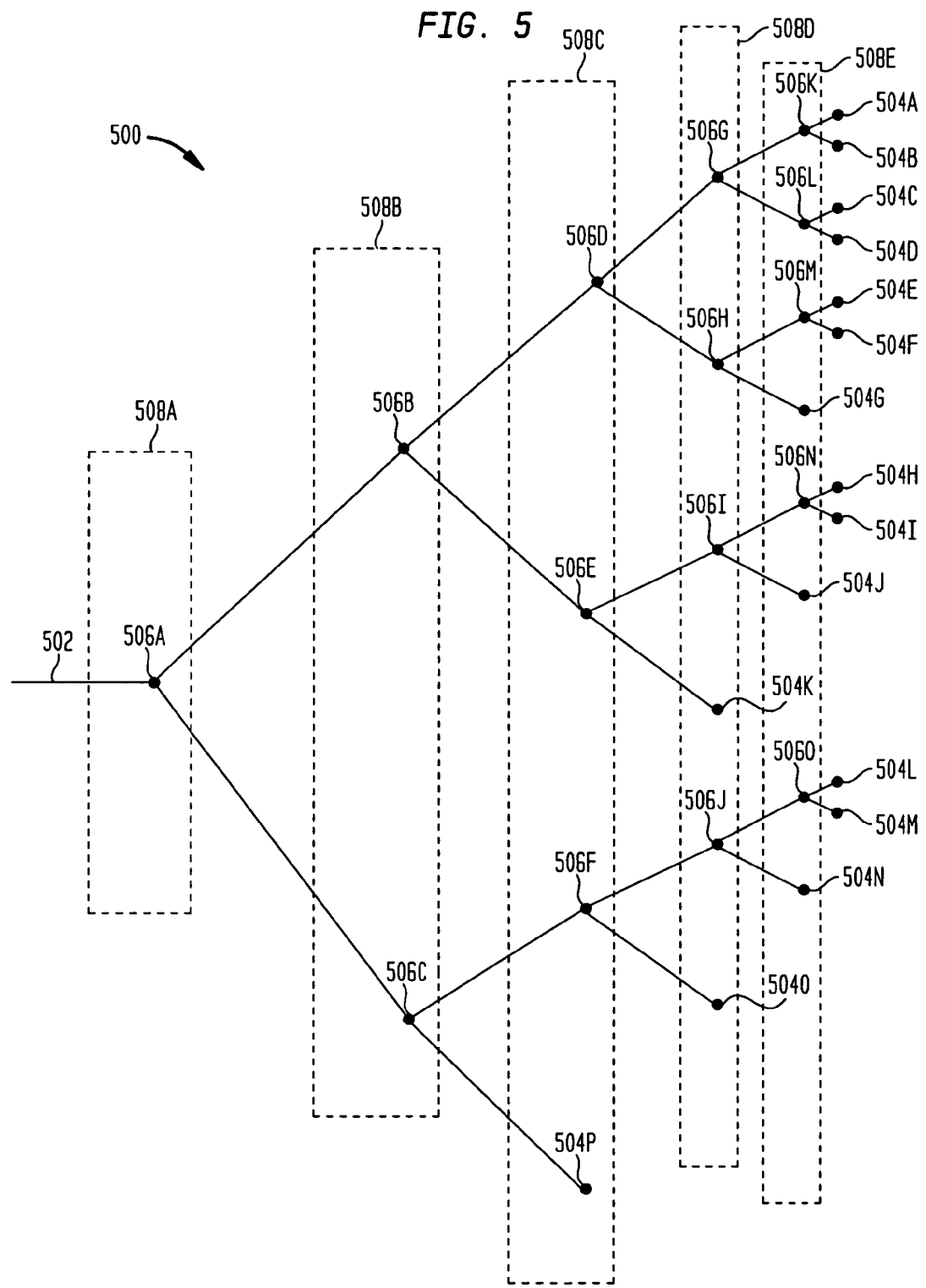
FIG. 5 illustrates an exemplary switch array designed using the teachings of the present invention.

FIG. 5 illustrates an exemplary array 500 that may suitably be designed using the teachings of the present invention. The array 500 has an input 502 and 16 outputs 504A-504P. The array 500 includes 15 switches 506A-506O, and is arranged into 5 stages 508A-508E. The array has a maximum power requirement of 2 and an average power requirement of 1.563. A 5 stage array could support a maximum of 32 ports. Using a 5 stage array to support 16 ports allows flexibility to significantly reduce power requirements of the array as compared to a four stage array, which would be the minimum depth array able to support 16 outputs. A four stage array would have a maximum power requirement of 4 and an average power requirement of 2, compared to the significantly lower maximum and average power requirements of the optimally designed 5 stage array 500.

While the present invention is disclosed in the context of a presently preferred embodiment, it will be recognized that a wide variety of implementations may be employed by persons of ordinary skill in the art consistent with the above discussion and the claims which follow below.

We claim:

1. A system for routing of optical signals, comprising:
an input for receiving a combined optical signal comprising a plurality of single wavelength signal components;
a demultiplexer for demultiplexing the combined signal to generate a plurality of single wavelength signals, each single wavelength signal corresponding to one of the components of the combined signal;
a plurality of routing system outputs, to each of which at least one of the single wavelength signals can be routed;
a plurality of switch arrays conforming to a configuration automatically computed to provide optimum power dissipation for the array, each switch array having a switch array input for receiving one of the single wavelength signals and a plurality of outputs, each output corresponding to one of the routing system outputs, the switch array being operative to route its input to one of the switch array outputs in order to route the signal to the routing system output, the switch array comprising a plurality of binary optical switches, each switch having a higher power output requiring a higher power dissipation when the signal is routed to that output and a lower power output requiring a lower power dissipation when the signal is routed to that output, each switch array being arranged in a plurality of stages, the number of stages being a maximum number of switches in any path from the switch array input to one of the switch array outputs, the number of stages corresponding to a predetermined maximum, each switch array being constructed such that the available paths from the input to the outputs require the minimum power dissipation possible given the required number of outputs for the array and the maximum number of stages of the array; and
a plurality of multiplexers, each multiplexer having a plurality of multiplexer inputs, each input being furnished by one of the outputs of each switch array and the multiplexer output furnishing the corresponding output of the routing system, each of the multiplexers being operative to combine the multiplexer inputs to produce the multiplexer output.

2. The routing system of claim 1, wherein more than one of the single wavelength signals can be routed to a single routing system output.

3. The routing system of claim 2, wherein the maximum number of stages of switches in each switch array is determined based on the required number of outputs and power dissipation limitations for the switch array.

4. The routing system of claim 3, wherein each of the switch arrays comprises more stages than the minimum number of stages required to provide the required number of outputs of the array and wherein the routings and lengths of the paths from the input to the outputs of each switch array is chosen so as to minimize the power dissipation of the array.

5. A switch array for routing of an optical signal to one of a plurality of outputs, configured in a layout automatically determined so as to provide optimum power dissipation for the array while furnishing a required number of outputs, comprising;
a switch array input for receiving the optical signal;
the plurality of switch array outputs, the optical signal being routed from the switch array input to one of the switch array outputs; and
a plurality of optical switches, each of the switches having a single input and two outputs, one of the outputs being a higher power output requiring higher power dissipation when a signal is routed to that output, the other of the outputs being a lower power output requiring lower power dissipation when a signal is routed to that output, the optical switches being arranged in a plurality of stages, the number of stages being a maximum number of switches in any path from the switch array input to one of the switch array outputs, the switches being arranged in an automatically determined configuration such that the available paths from the switch array input to the switch array outputs require the minimum power dissipation possible given the required number of switch array outputs and the maximum number of switches allowed in a path.

6. The switch array of claim 5, wherein the number of stages of the switch array is computed based on the required number of outputs of the array and predetermined power constraints on the array.

7. The switch array of claim 6, wherein the plurality of switches is arranged in more stages than the minimum number of stages required to provide the required number of outputs of the array and wherein the routing and length of each path from the input to an output is chosen so as to minimize the power dissipation of the array.

8. The switch array of claim 7, wherein the paths from the input to the outputs are configured such that the number and lengths of segments of paths following lower power switch outputs are maximized while the number and lengths of segments of paths following higher power switch outputs are minimized.

9. The switch array of claim 8, wherein the switches are arranged so as to provide the minimum path length for each path needed for the array to provide the required number of outputs while providing the minimum possible power dissipation for the array.

10. A switch array for routing of an optical signal to one of a plurality of outputs, configured in a layout automatically determined so as to provide optimum power dissipation for the array while furnishing a required number of outputs, comprising:
a switch array input for receiving the optical signal;
the plurality of switch array outputs, the optical signal being routed from the switch array input to one of the switch array outputs;

a plurality of at least 15 optical switches, each of the switches having a single input and two outputs, one of the outputs being a higher power output requiring higher power dissipation when a signal is routed to that output, the other of the outputs being a lower power output requiring lower power dissipation when a signal is routed to that output, the optical switches being arranged in a plurality of at least 5 stages, the number of stages being a maximum number of switches in any path from the switch array input to one of the switch array outputs, the number of stages being greater than the minimum number of stages needed to provide the required number of outputs, the switches being arranged in an automatically determined configuration maximizing the number and length of segments of paths following lower power switch outputs and minimizing the number and length of segments of paths following higher power switch outputs.

* * * * *